(12) United States Patent
Rajagopalan

(10) Patent No.: US 8,862,363 B2
(45) Date of Patent: Oct. 14, 2014

(54) CLOSED LOOP PROPULSION SYSTEM TRANSIENT RESPONSE PREDICTOR

(71) Applicant: United Technologies Corporation, Hartford, CT (US)

(72) Inventor: Ramesh Rajagopalan, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 34 days.

(21) Appl. No.: 13/623,167

(22) Filed: Sep. 20, 2012

(65) Prior Publication Data

US 2014/0081547 A1    Mar. 20, 2014

(51) Int. Cl.
*G06F 19/00* (2011.01)
*G06G 7/70* (2006.01)

(52) U.S. Cl.
USPC .............................................. 701/100; 701/99

(58) Field of Classification Search
CPC ..................................... F03D 7/04; F02C 9/00
USPC .................................................... 701/100, 99
See application file for complete search history.

(56) References Cited

U.S. PATENT DOCUMENTS

| | | | |
|---|---|---|---|
| 5,042,245 A | 8/1991 | Zickwolf, Jr. | |
| 6,078,859 A * | 6/2000 | Jastrzebski et al. | 701/93 |
| 6,173,218 B1 | 1/2001 | Vian | |
| 6,571,568 B1 * | 6/2003 | Link | 62/244 |
| 2005/0149234 A1 | 7/2005 | Vian et al. | |
| 2011/0137505 A1 | 6/2011 | Stervik et al. | |
| 2012/0153074 A1 * | 6/2012 | Nannoni et al. | 244/17.13 |

* cited by examiner

*Primary Examiner* — Calvin Cheung
*Assistant Examiner* — Paula L Schneider
(74) *Attorney, Agent, or Firm* — Carlson, Gaskey & Olds, P.C.

(57) ABSTRACT

An electronic engine controller includes a commanded rotor speed input, an altitude input, and a current rotor speed input, a computer processor, and a memory storing a prediction logic. The prediction logic is operable to cause the processor to determine a predictive value representative of a closed loop transient response of a propulsion system's actual corrected low rotor speed in response to a commanded change in low rotor speed.

18 Claims, 7 Drawing Sheets

CLOSED LOOP PROPULSION SYSTEM TRANSIENT RESPONSE PREDICTOR

TECHNICAL FIELD

The instant disclosure relates generally to closed loop propulsion systems including, but not limited to, the engine, actuators, sensors, electronics, and closed loop engine control software, and more specifically to an open loop transient response predictor for the same.

BACKGROUND OF THE INVENTION

Electronic engine controllers that control various aspects of a propulsion system are often included in aircraft design in order to provide a smooth translation of pilot commands, such as accelerate or decelerate commands, to engine operations.

Conventional approaches to detect TCM events, such as the deceleration rate limit to identify runaway engine conditions will not provide consistent results as the engine condition, operating and ambient conditions influence the engine response significantly. It is also difficult to come up with different sets of deceleration limit to cover all possible situations. Further, the conventional approaches do not capture the engine closed loop acceleration response characteristics to decide whether the engine is accelerating or decelerating. The conventional approaches utilize a small perturbation model and are limited to small changes in speed of the aircraft. This limitation increases response time of the controller and includes a large amount of computational complexity.

SUMMARY OF THE INVENTION

An electronic engine controller according to an exemplary embodiment of this disclosure, among other possible things includes a commanded rotor speed input, an altitude input, and a current rotor speed input, a computer processor, and a memory storing a prediction logic operable to cause the processor to determine a predictive value representative of a closed loop transient response of a propulsion system's actual corrected low rotor speed in response to a commanded change in low rotor speed.

A further embodiment of the foregoing electronic engine controller, includes a lookup table stored in the memory, the lookup table includes multiple possible correction terms for adjusting a lower end of a valid prediction level for altitude In a further embodiment of the foregoing electronic engine controller, the prediction logic includes an acceleration transfer function/logic, a deceleration transfer function/logic, and a selector logic.

In a further embodiment of the foregoing electronic engine controller, the selector logic includes, a switching logic block operable to pass one of an acceleration prediction and a deceleration prediction to a smoothing transfer function, a derivative block and an initial transfer function block each being operable to condition and process a requested rotor speed input, and the switching logic block is operable to determine which of the acceleration prediction and the deceleration prediction to pass based on an output of the initial transfer function block.

In a further embodiment of the foregoing electronic engine controller, the acceleration transfer function/logic includes a delay processing block and a transfer function block.

In a further embodiment of the foregoing electronic engine controller, the delay processing block is operable to prevent the acceleration transfer function/logic from outputting an acceleration prediction when a corresponding turbine engine is operating outside of a valid operating window.

In a further embodiment of the foregoing electronic engine controller, the transfer function block includes a transfer function including an altitude correction term, and the transfer function is operable to determine a predicted engine acceleration response based on the commanded rotor speed input, the altitude input, and the current rotor speed input.

In a further embodiment of the foregoing electronic engine controller, the deceleration transfer function/logic comprises a delay processing block and a transfer function block.

In a further embodiment of the foregoing electronic engine controller, the delay processing block is operable to prevent the acceleration transfer function/logic from outputting an acceleration prediction when a corresponding turbine engine is operating outside of a valid operating window.

In a further embodiment of the foregoing electronic engine controller, the transfer function block includes a transfer function including an altitude correction term, and the transfer function is operable to determine a predicted engine acceleration response based on the commanded rotor speed input, the altitude input, and the current rotor speed input.

In a further embodiment of the foregoing electronic engine controller, the prediction logic is an open loop prediction logic.

A method for predicting a propulsion system engine response according to an exemplary embodiment of this disclosure, among other possible things includes inputting a commanded rotor speed input, an altitude input, and a current rotor speed input to predictor logic for a controller including, and outputting a prediction value representative of a propulsion system's actual closed loop transient response to a commanded low rotor speed.

A further embodiment of the foregoing method includes the steps of determining whether the commanded rotor speed is an acceleration or a deceleration using a selector logic, passing an acceleration transfer function/logic output to a prediction logic output when the commanded rotor speed is an acceleration, and passing a deceleration transfer function/logic output to a prediction logic output when the commanded rotor speed is a deceleration.

A further embodiment of the foregoing method includes determining an acceleration prediction by passing the commanded rotor speed through a transfer function, the transfer function includes an altitude correction term operable to adjust the lower end of the prediction level.

A further embodiment of the foregoing method includes determining a deceleration prediction by passing the commanded rotor speed through a transfer function, the transfer function includes an altitude correction term operable to adjust the lower end of the prediction level.

A further embodiment of the foregoing method includes determining an acceleration prediction by passing the commanded rotor speed through a transfer function, the transfer function includes an altitude correction term, determining a deceleration prediction by passing the commanded rotor speed through a transfer function, the transfer function includes an altitude correction term, determining whether the commanded rotor speed is an acceleration or a deceleration using a selector logic, passing the acceleration prediction to a prediction logic output when the commanded rotor speed is an acceleration, and passing the deceleration prediction to a prediction logic output when the commanded rotor speed is a deceleration.

A further embodiment of the foregoing method includes determining the propulsion system is outside of a valid operating window, and delaying the step of outputting a prediction value representative of a propulsion system's actual closed loop transient response to a commanded low rotor speed until said propulsion system is operating within the valid operating window.

An add on for an electronic engine controller according to an exemplary embodiment of this disclosure, among other possible things includes a commanded rotor speed input, an altitude input, and a current rotor speed input, a computer processor, a memory storing a prediction logic operable to cause the processor to determine a predictive value representative of a closed loop transient response of a propulsion system's actual corrected low rotor speed in response to a commanded change in low rotor speed; and the add on connects to an existing electronic engine controller.

These and other features of the present invention can be best understood from the following specification and drawings, the following of which is a brief description.

DETAILED DESCRIPTION

Figure 1:
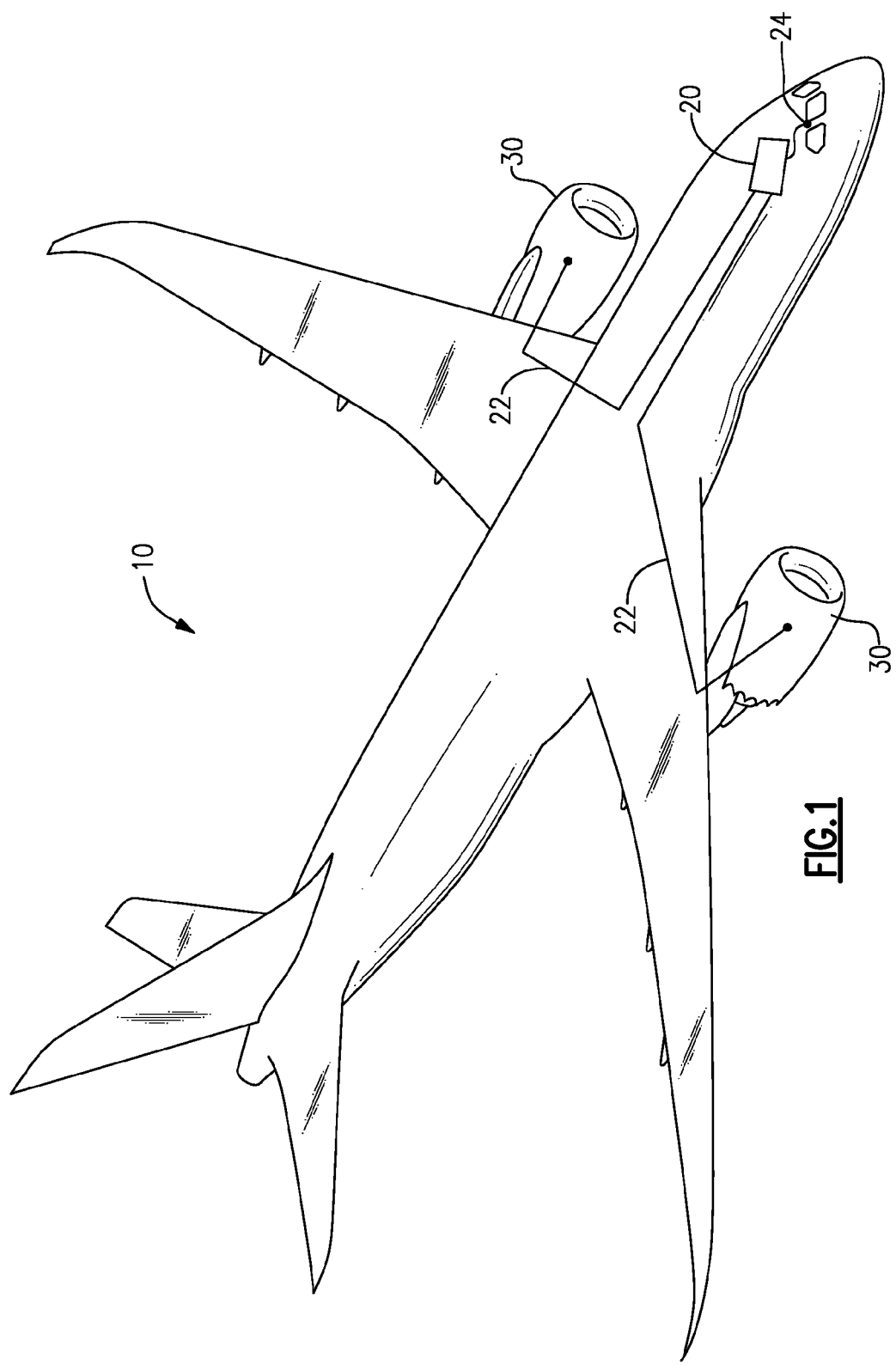
FIG. 1 schematically illustrates an aircraft having a propulsion system controller.

FIG. 1 illustrates a commercial aircraft 10, such as a passenger aircraft. The aircraft 10 includes a propulsion systems controller 20 connected to each of the engines 30 via a control line 22. Each of the control lines 22 is illustrated as a single line terminating at the corresponding engine 30, however, each control line 22 can include multiple control connections and provide controls to multiple varied engine 30 components. The propulsion systems controller 20 is further connected to cockpit controls 24 and receives pilot commands, such as "accelerate" and "decelerate" from the cockpit controls 24.

As part of the propulsion controls, it is desirable for the propulsion systems controller 20 to predict a closed loop transient response of the propulsion system's rotor speed in response to a rotor speed change command from the cockpit controls 24 to identify situations such as the runaway or unresponsive engines. An open loop logic (illustrated in FIG. 2) is used to predict the closed loop engine systems response while the engine is operating at between 50% and 100% of maximum takeoff power. The open loop predictor logic accounts for the ambient conditions of the engine 30 and the operating envelope (altitude) of the aircraft 10.

Figure 2:
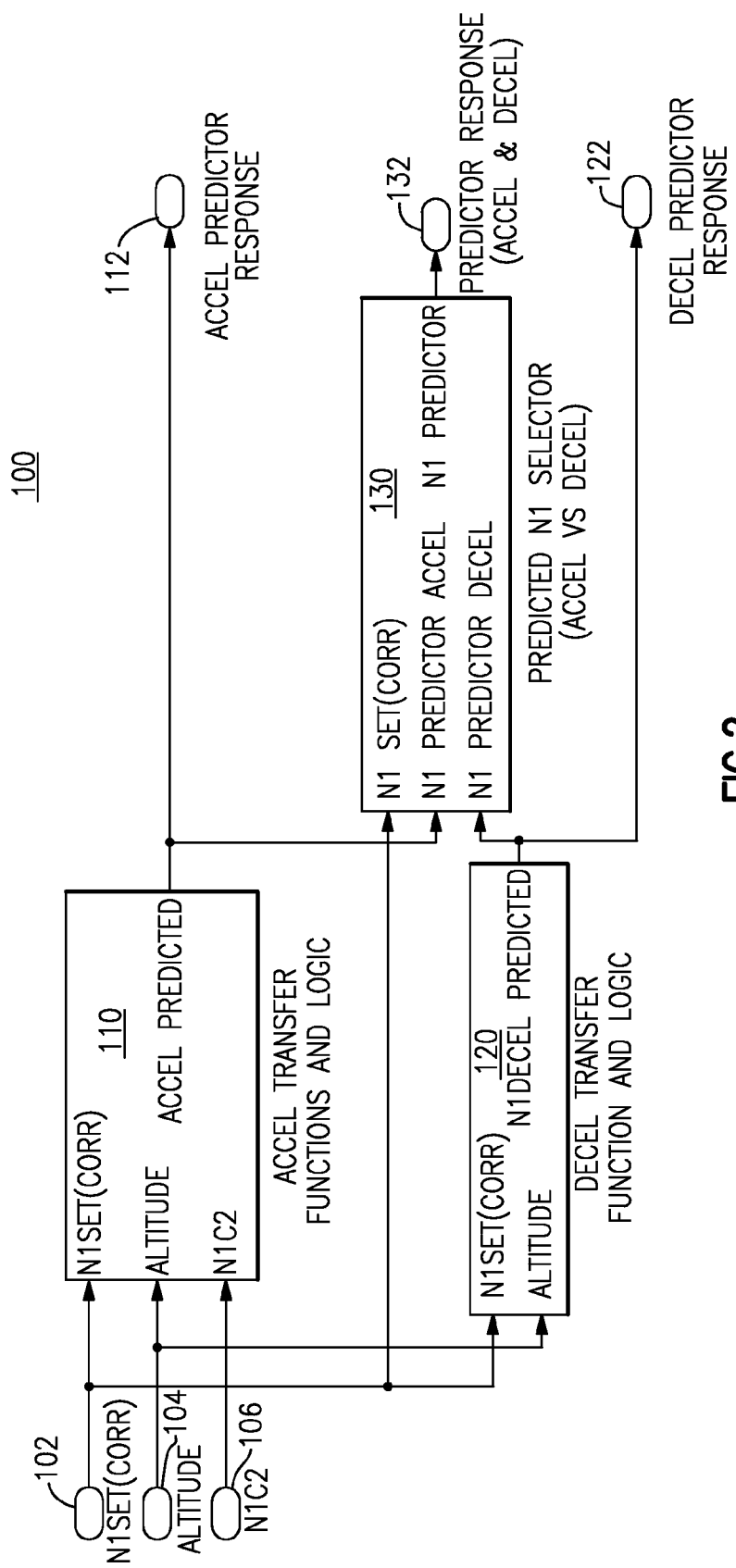
FIG. 2 schematically illustrates a predictor logic for the propulsion system controller of FIG. 1.

FIG. 2 schematically illustrates an open loop predictor logic 100 for the propulsion systems controller 20 of FIG. 1 as an add-on control system. The open loop predictor logic 100 has three inputs, a requested altitude corrected rotor speed input 102, an altitude input 104, and a corrected rotor speed input 106. The open loop predictor logic 100 includes three primary logic functions, an acceleration transfer function/logic 110, a deceleration transfer function/logic 120 and a selector function/logic 130.

The acceleration transfer function/logic 110 accepts each of the three inputs 102, 104, 106 and outputs an acceleration predicted 112 of the engine 30 in response to the pilot command. Similarly, the deceleration function/logic 120 accepts the requested rotor speed input 102 and the altitude input 104 and outputs a deceleration prediction 122 of the engine 30 in response to the pilot command.

The selector 130 receives the output of each of the acceleration transfer function/logic 110 and the deceleration transfer function/logic 120 and receives the requested rotor speed input 102. Based on the requested rotor speed input 102, the selector 130 determines whether the input pilot command is requesting an acceleration of the engine 30 or a deceleration of the engine 30. The selector 130 then passes the corresponding prediction to a predictor response output 132. The predictor response output 132 is transmitted to the engine controller as the predicted engine response.

The selector 130 selects the predicted acceleration or deceleration response based on whether the pilot has commanded an acceleration or deceleration. In this illustration, this information is derived using the slope of the rate of change of the requested rotor speed input 102. It is understood that this information can be derived by other means. A blending scheme is used within the selector 130 to blend the two predicted responses and achieve a smooth transition from the acceleration response to the deceleration response and vice versa when the pilot command is altered. The predictor logic 100 can predict the closed loop transient response of the propulsion system when the engine is operating at anywhere from 50% of max take off power to 100% of max take off power. In alternate examples, the predictor logic 100 can be designed to provide predictions below 50% max take off power, however, such an alteration requires an increase in computational complexity. This operating window (50%-100% maximum takeoff power) is referred to as the valid operating window and produces valid results in the predictor logic.

Figure 3A:
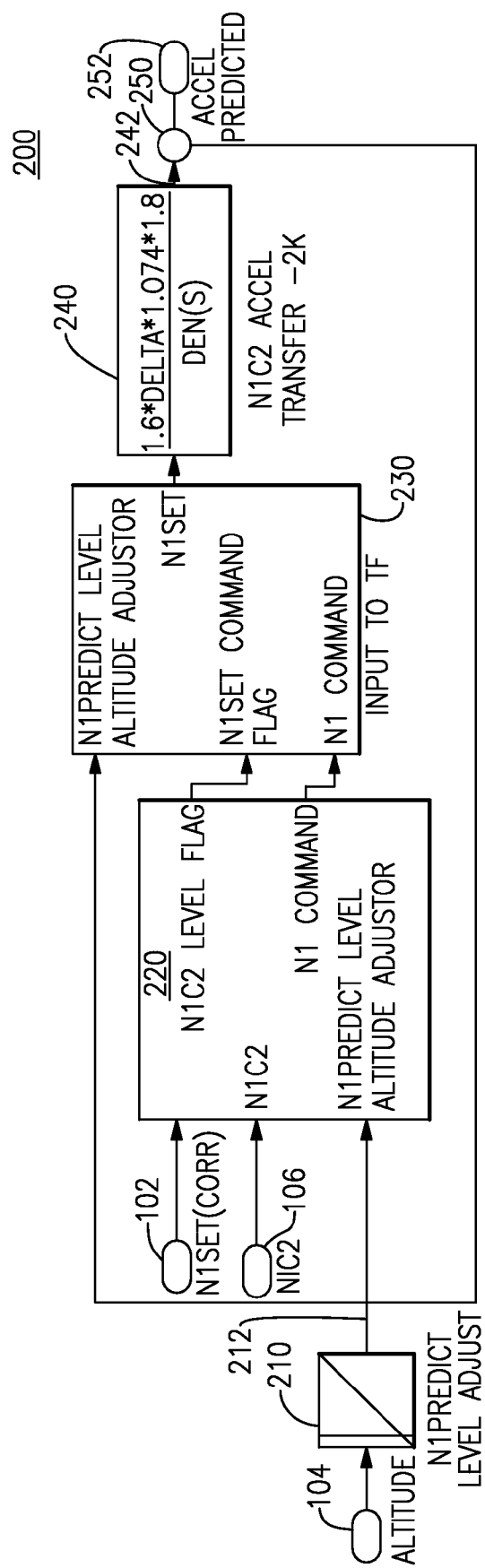
FIG. 3A schematically illustrates an accelerate logic portion of the predictor logic of FIG. 2 in greater detail.
Figure 3B:
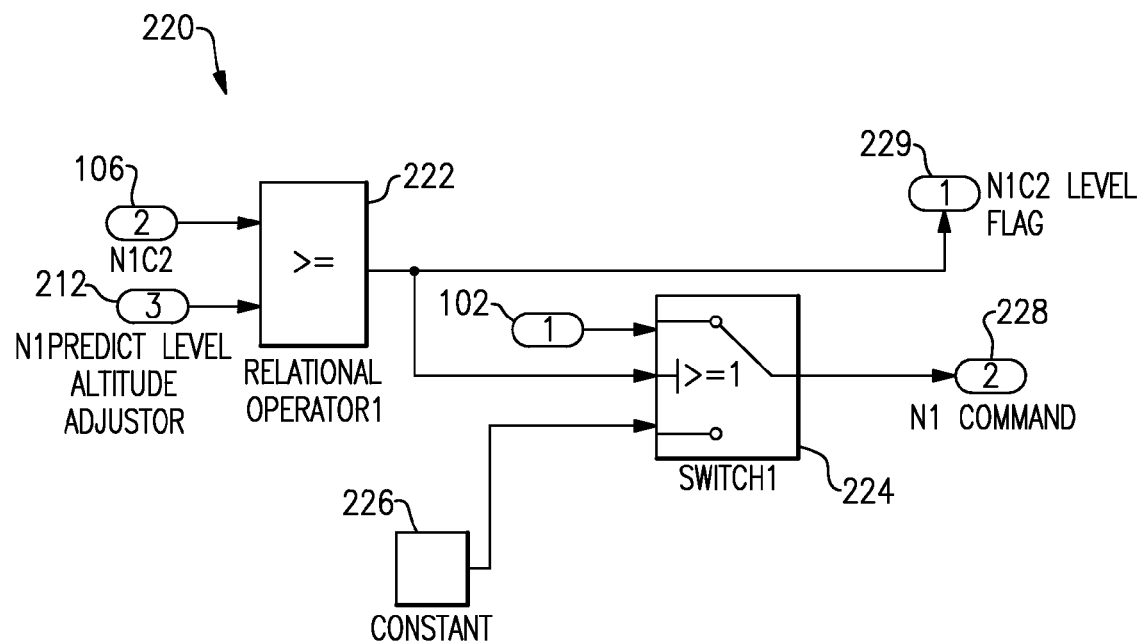
FIG. 3B schematically illustrates a processing delay block for utilization in the predictor logic of FIG. 3A.

FIG. 3B illustrates the accelerate transfer function/logic 110, 200 portion of the predictor logic of FIG. 1 in greater detail. The accelerate transfer function/logic 200 includes an altitude adjustor 210 adjusts a lower end of the prediction window for the rotor speed such that the valid operating window corresponds to the 50% max take off power as a function of the altitude value 104 for the accelerate transfer function/logic 110 and 200. The altitude adjustor 210 outputs an altitude adjusted lower end of the predicted rotor speed 212 that is provided to a delay processing logic block 220, a transfer function input logic block 230, and a summation logic block 250. The relationship between altitude and altitude adjusted lower end of the predicted rotor speed value is stored in a look up table in a memory of the controller 20.

The processing delay block 220 also accepts the requested rotor speed input 102, the corrected rotor speed input 106, and the altitude adjusted lower end of the predicted rotor speed 212. The processing delay block 220 determines whether the propulsion system has exceeded 50% of the max take off power value based on the inputs 102, 106, and ensures that the predictor 100 does not output a prediction unless the propulsion system is operating within the valid operating window. Thus, the processing delay block 220 prevents the acceleration transfer function logic 110 from outputting a result unless the propulsion system is in the valid operating window of the predictor 100. An input control logic block 230 conditions the inputs to an acceleration transfer function 240.

It is understood that pressure variations resulting from altitude changes can affect the results of the predictor, leading to multiple possible predicted engine responses form a single input. Each of the possible engine responses can be collapsed into a single response if a pressure correction term delta) is applied to the data for various altitude, and airspeed conditions. This is achieved by using a baseline transfer function assuming −2000 as the altitude and standard day conditions as an acceleration transfer function 240. The acceleration transfer function 240 coefficients are corrected using the pressure correction term (delta). The possible pressure correction terms (delta) are stored in a look up table, from which the controller 20 selects the appropriate pressure correction term (delta) based on the altitude and the ambient temperatures to adjust the prediction level in the adjustor 210. This scheme results in only a single predicted engine response that accounts for the altitude and the ambient air conditions. The look up table is stored locally on a memory of the controller 20.

The acceleration transfer function 240 used by the predictor is derived using simulated flight data and validated using actual flight data. In the illustrated example, the transfer function 240 is [1.6*delta*1.074*1.8]/[1 2*sqrt (1.6*delta*1.074*1.8)*0.8 1.6*delta*1.074*1.8]. It is understood that the coefficients vary depending on the particulars of the aircraft, the propulsion system being utilized and the electronic engine control algorithm used, and can be derived by a person of ordinary skill in the art in light of this disclosure.

The transfer function block 240 outputs a predicted acceleration 242 that is scaled by the pressure correction term (delta) using a summation block 250. The summation block 250 outputs an overall acceleration prediction 252.

FIG. 3B illustrates the processing delay block 220 of FIG. 3A. The processing delay block 220 includes three inputs, the requested rotor speed input 102, the corrected rotor speed input 106, and the altitude adjusted lower end of the predicted rotor speed 212. A comparator 222 within the processing delay block accepts the inputs 106, 212 and compares the inputs to determine if the corrected rotor speed input 106 exceeds the altitude adjusted lower end of the predicted rotor speed 212. If the corrected rotor speed input 106 exceeds the altitude adjusted lower end of the predicted rotor speed 212, the comparator outputs a flag 229 indicating that the engine has exceeded 50% max engine takeoff power.

The flag 229 is passed to a switch 224, and controls the output of the switch 224. When the flag 229 is high, indicating that the engine has exceeded 50% max takeoff power, the switch 224 is set to pass the requested rotor speed input 102 as a command 228. If the flag 229 is low, the switch connects to a constant command generator 226 and passes a constant signal as the command 228. In one example, the constant signal is set as a 1500 RPM command.

Figure 3C:
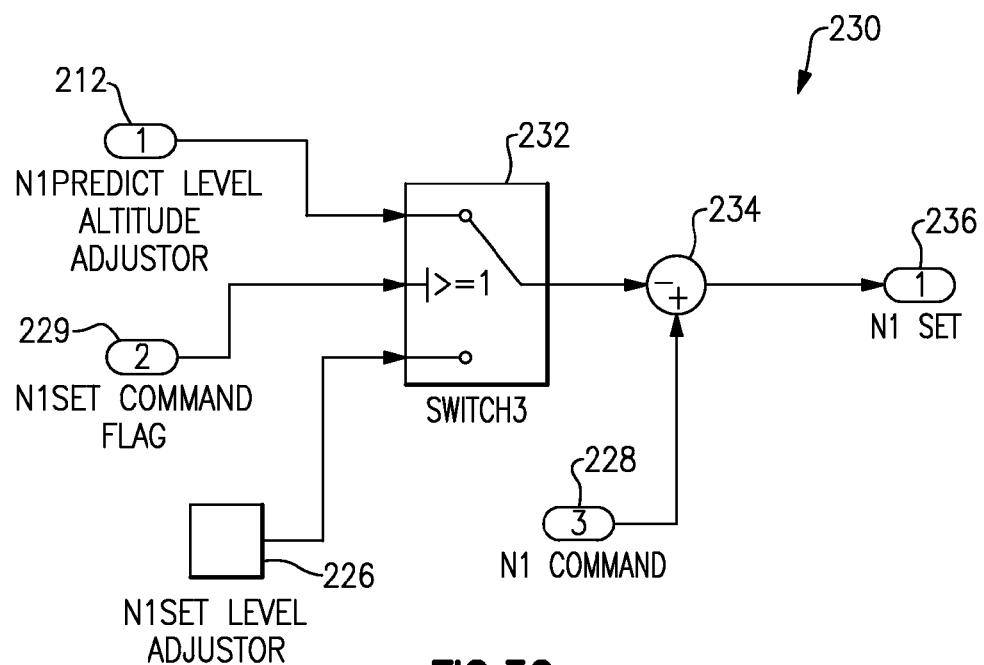
FIG. 3C schematically illustrates an input control logic block for utilization in the predictor logic of FIG. 3A.

FIG. 3C illustrates the input control logic block 230 of FIG. 3A. the input control logic block 230 includes a switch 232 connected to the altitude adjusted lower end of the predicted rotor speed 212 to adjust the N1 prediction level as a function of altitude in one state, and to a constant command generator 226 in a second state. In some examples, the constant command generators 226 of FIGS. 3B and 3C can be the same constant command generator 226.

The switch 232 also receives the flag 229 from the processing delay block 220 comparator 222 at a control input. When the flag 229 is high, the switch passes the altitude adjusted lower end of the predicted rotor speed 212 to a summation block 234. When the flag is low, however, the switch passes the constant command from the constant command generator 226 to the summation block 234. The summation block 234 accepts the value passed from the switch 232 and combines it with the command 228 to determine a difference between the initial command and the change command. This difference is output to the transfer function block 240 which represents the acceleration phase of the corrected commanded rotor speed 102 above the 50% max takeoff power.

Figure 4A:
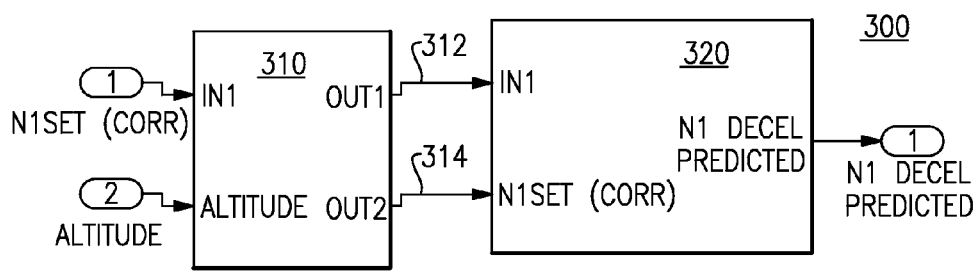
FIG. 4A schematically illustrates an decelerate logic portion of the predictor logic of FIG. 2 in greater detail.

FIG. 4A illustrates the deceleration transfer function/logic 120 of the predictor logic of FIG. 1 in greater detail. The deceleration logic 300 includes a delay processing logic block 310 that operates similar to the delay processing block 220 illustrated in FIG. 3, and prevents the deceleration logic 300 from outputting a deceleration value when the engine is operating outside of the valid operating window. The delay processing block 310 includes two outputs, a switch control output 312 and a requested rotor speed output 314. The deceleration transfer function block 320 accepts the outputs 312, 314 from the delay processing block 310, and generates a predicted deceleration output 322 using a stored transfer function (illustrated in FIG. 5).

Figure 4B:
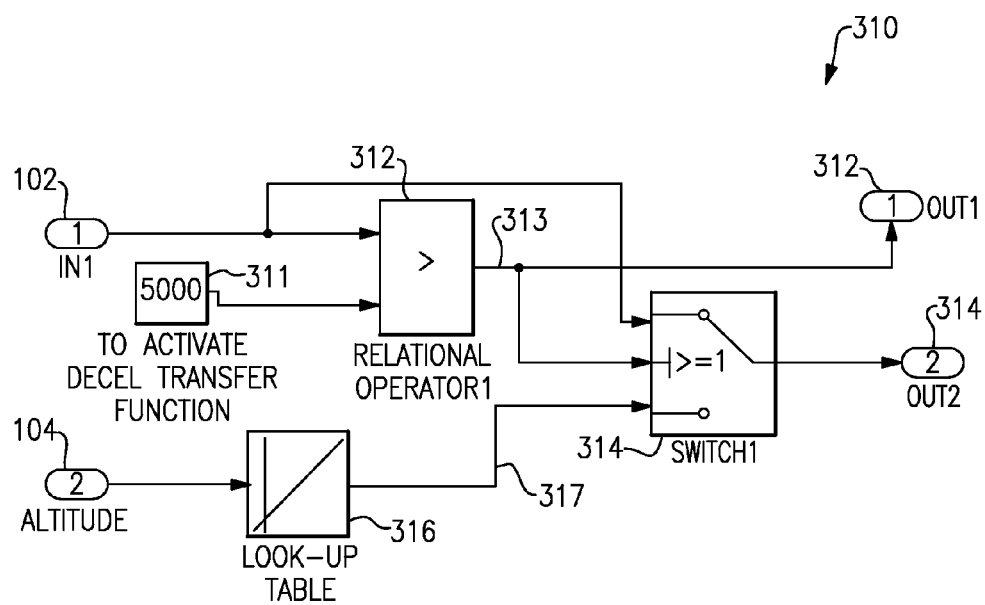
FIG. 4B schematically illustrates a processing delay logic block for utilization in the predictor logic of FIG. 4A.

FIG. 4B illustrates the delay processing logic block 310 of FIG. 4 in greater detail. The delay processing logic block 310 accepts the requested rotor speed input 102 and the altitude input 104. The requested rotor speed input 102 is compared to a value from a minimum requested engine speed generator 311 in a comparator 312 to identify when deceleration is commanded. While the requested engine speed 102 exceeds the minimum requested engine speed 311, the comparator outputs a high flag 313 to a switch 314 and to the deceleration transfer function block 320.

The flag 313 controls the state of the switch 314, and passes the requested rotor speed input 102 to a corrected rotor speed output 314 when the requested rotor speed 102 exceeds the minimum requested rotor speed from the minimum requested rotor speed block 311. When the requested rotor speed 102 falls below the minimum requested rotor speed, the altitude adjusted lower end of the predicted rotor speed 317 is passed from a look up table 316. The look up table accepts the altitude input 104 to determine the altitude adjusted lower end of the predicted rotor speed 317.

Figure 5:
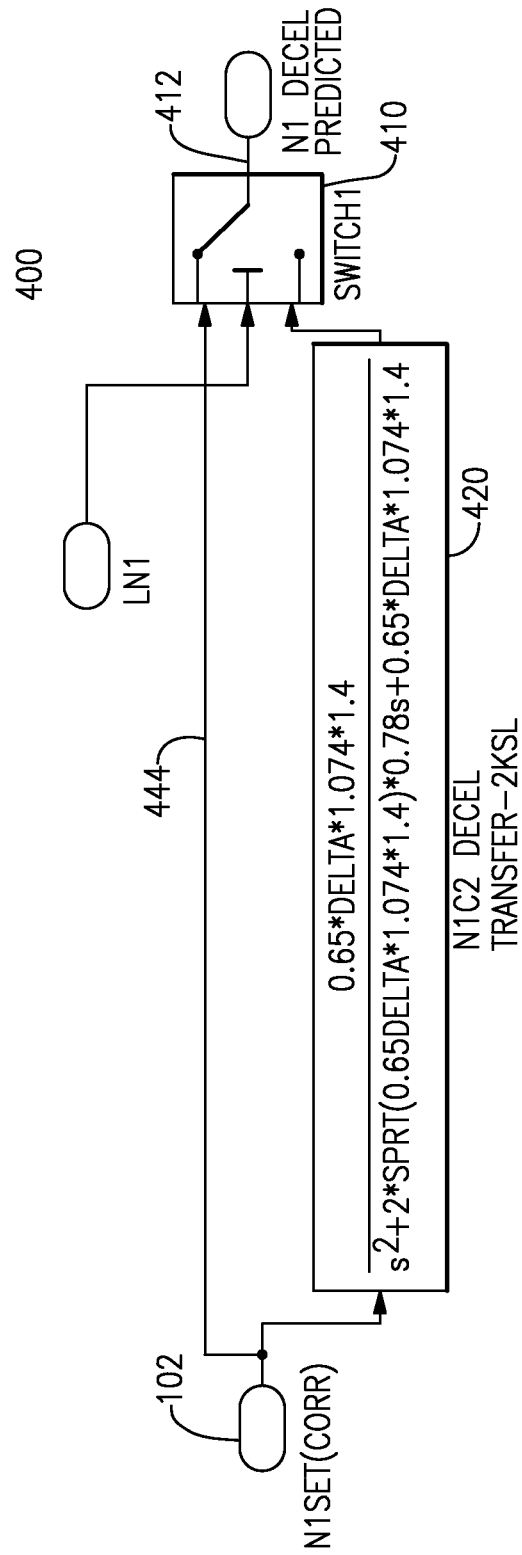
FIG. 5 schematically illustrates a deceleration transfer function of the decelerate logic portion of FIG. 4 in greater detail.

FIG. 5 illustrates the deceleration transfer function 400 portion of the deceleration transfer function/logic 300 of FIG. 4 in greater detail. The transfer function 400 portion of the deceleration transfer function/logic 300 includes a switch 410 and a deceleration prediction transfer function block 420. The switch 410 accepts the delay output 312 from the delay processing block 310 (illustrated in FIG. 4) as a control input. When the delay output 312 indicates that the propulsion system is within the valid operating window, the switch 410 connects a switch output 412 the transfer function block 420. When the delay output 312 indicates that the propulsion system is outside of the valid operating window, the switch connects the switch output 412 to a transfer function bypass signal 414 that connects the requested rotor speed input 102 to the switch 410.

The transfer function block 420 accepts the requested rotor speed input 102 and passes the requested rotor speed through a transfer function, to determine a predicted propulsion system deceleration in response to the requested rotor speed input 102. The transfer function in the illustrated example is [0.65*delta*1.074*1.4]/[s^2+2*sqrt(0.65*delta*1.074*1.4)*0.78 s+0.65*delta*1.074*1.4]. As with the transfer function used to predict the acceleration in FIG. 3, the constants of the transfer function vary depending on the particulars of the specific aircraft, and the possible pressure correction terms (delta) are stored in a look up table, from which the controller 20 selects the appropriate pressure correction term (delta) based on the altitude and the ambient conditions of the aircraft.

Referring back to FIG. 2, each of the acceleration prediction 112 from the acceleration prediction logic 110 and the deceleration prediction 122 from the deceleration prediction logic block 120 are blended in the selector logic block 130 and a combined predictor response 132 is output from the selector 130.

Figure 6:
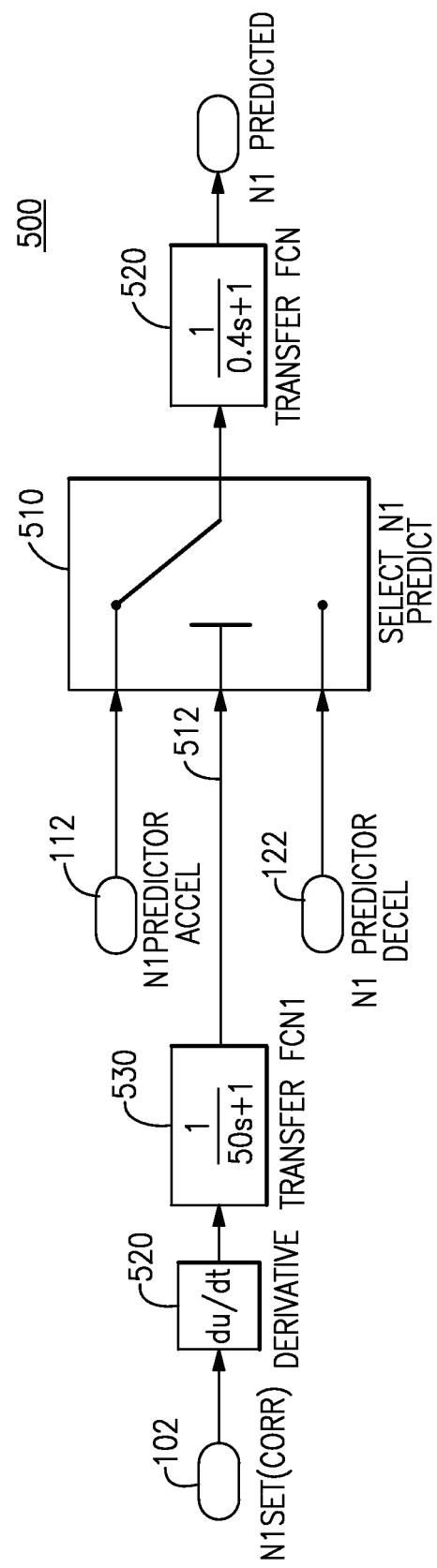
FIG. 6 schematically illustrates a selector logic of the predictor logic of FIG. 2 in greater detail.

FIG. 6 illustrates the control logic 500 within the selector block 130 in greater detail. As described above, with regards to FIG. 1, the selector block 500 has three inputs, the acceleration prediction 112, the deceleration prediction 122, and a requested rotor speed input 102. Each of the acceleration prediction 112 and the deceleration prediction 122 are input to a selector switch 510.

The selector switch 510 further includes a control input 512 that controls whether the acceleration prediction 112 or the deceleration prediction 122 is passed through the selector switch 510. The requested rotor speed input 102 is processed and conditioned using a derivative logic block 520 and an initial transfer function block 530 that represents a filter to eliminate noise in the rate of change of the requested rotor speed 102 as it accounts for rapid movement of the pilot lever by the pilot, and the output of this processing (i.e. the output of the initial transfer function block 530) is the control input 512.

The output of the selector switch 510 is passed through a smoothing transfer function that achieves a smooth transition between the acceleration prediction 112 being passed through the switching logic 510 and the deceleration prediction being passed through the selector logic 510 when the pilot command changes from acceleration to deceleration or vice versa. In one exemplary embodiment, the smoothing transfer function is $[1]/[0.4*s+1]$.

Using the above described prediction scheme allows the controller 20 (illustrated in FIG. 1) to predict responses to large and small acceleration/deceleration commands in a single computational step using one transfer function for all of the operating conditions of the aircraft.

The above described system is used as an add on to the existing electronic engine controllers and can be used detect emergency situations such as the Thrust Control Malfuction (TCM). On one such implementation, to declare a TCM event, the predicted response is compared with the actual response as observed by the closed loop electronic engine controller or the pilot command. In a typical TCM situation, due to malfunction in the engine control system, a closed loop propulsion system may not respond to pilot commands and will either continue to operate at the previously commanded power level or continue to increase the power, resulting in runaway condition.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An electronic engine controller comprising:
    a commanded rotor speed input, an altitude input, and a current rotor speed input;
    a computer processor; and
    a memory storing a prediction logic operable to cause the processor to determine a predictive value representative of a closed loop transient response of a propulsion system's actual corrected low rotor speed in response to a commanded change in low rotor speed.

2. The electronic engine controller of claim 1, further comprising a lookup table stored in said memory, wherein said lookup table includes multiple possible correction terms for adjusting a lower end of a valid prediction level for altitude.

3. The electronic engine controller of claim 1, wherein said prediction logic comprises an acceleration transfer function/logic, a deceleration transfer function/logic, and a selector logic.

4. The electronic engine controller of claim 3, wherein said selector logic comprises:
    a switching logic block operable to pass one of an acceleration prediction and a deceleration prediction to a smoothing transfer function;
    a derivative block and an initial transfer function block each being operable to condition and process a requested rotor speed input; and
    wherein said switching logic block is operable to determine which of said acceleration prediction and said deceleration prediction to pass based on an output of said initial transfer function block.

5. The electronic engine controller of claim 3, wherein said acceleration transfer function/logic comprises a delay processing block and a transfer function block.

6. The electronic engine controller of claim 5, wherein said delay processing block is operable to prevent said acceleration transfer function/logic from outputting an acceleration prediction when a corresponding turbine engine is operating outside of a valid operating window.

7. The electronic engine controller of claim 6, wherein said transfer function block comprises a transfer function including an altitude correction term, and wherein said transfer function is operable to determine a predicted engine acceleration response based on the commanded rotor speed input, the altitude input, and the current rotor speed input.

8. The electronic engine controller of claim 3, wherein said deceleration transfer function/logic comprises a delay processing block and a transfer function block.

9. The electronic engine controller of claim 8, wherein said delay processing block is operable to prevent said acceleration transfer function/logic from outputting an acceleration prediction when a corresponding turbine engine is operating outside of a valid operating window.

10. The electronic engine controller of claim 8, wherein said transfer function block comprises a transfer function including an altitude correction term, and wherein said transfer function is operable to determine a predicted engine acceleration response based on the commanded rotor speed input, the altitude input, and the current rotor speed input.

11. The electronic engine controller of claim 1, wherein said prediction logic is an open loop prediction logic.

12. A method for predicting a propulsion system engine response comprising:
    inputting a commanded rotor speed input, an altitude input, and a current rotor speed input to predictor logic for a controller comprising
        a commanded rotor speed input, an altitude input, and a current rotor speed input;
        a computer processor;
        a memory storing a prediction logic operable to cause the processor to determine a predictive value representative of a closed loop transient response of a propulsion system's actual corrected low rotor speed in response to a commanded change in low rotor speed; and outputting a prediction value representative of a propulsion system's actual closed loop transient response to a commanded low rotor speed.

13. The method of claim 12, further comprising the steps of:
    determining whether said commanded rotor speed is an acceleration or a deceleration using a selector logic;
    passing an acceleration transfer function/logic output to a prediction logic output when said commanded rotor speed is an acceleration; and
    passing a deceleration transfer function/logic output to a prediction logic output when said commanded rotor speed is a deceleration.

14. The method of claim 12 further comprising the steps of:
    determining an acceleration prediction by passing said commanded rotor speed through a transfer function, wherein said transfer function includes an altitude correction term operable to adjust the lower end of the prediction level.

15. The method of claim 12 further comprising the step of:
    determining a deceleration prediction by passing said commanded rotor speed through a transfer function, wherein said transfer function includes an altitude correction term operable to adjust the lower end of the prediction level.

16. The method of claim 12 comprising the steps of
    determining an acceleration prediction by passing said commanded rotor speed through a transfer function, wherein said transfer function includes an altitude correction term;
    determining a deceleration prediction by passing said commanded rotor speed through a transfer function, wherein said transfer function includes an altitude correction term;
    determining whether said commanded rotor speed is an acceleration or a deceleration using a selector logic;
    passing the acceleration prediction to a prediction logic output when said commanded rotor speed is an acceleration; and
    passing the deceleration prediction to a prediction logic output when said commanded rotor speed is a deceleration.

17. The method of claim 12, further comprising the steps of
    determining the propulsion system is outside of a valid operating window; and
    delaying the step of outputting a prediction value representative of a propulsion system's actual closed loop transient response to a commanded low rotor speed until said propulsion system is operating within the valid operating window.

18. An add on for an electronic engine controller, wherein the add on comprises:
    a commanded rotor speed input, an altitude input, and a current rotor speed input;
    a computer processor;
    a memory storing a prediction logic operable to cause the processor to determine a predictive value representative of a closed loop transient response of a propulsion system's actual corrected low rotor speed in response to a commanded change in low rotor speed; and
    wherein said add on connects to an existing electronic engine controller.

* * * * *